Oct. 6, 1953 — R. C. FIDLER — 2,654,337
TIRE ALARM
Filed Oct. 23, 1951
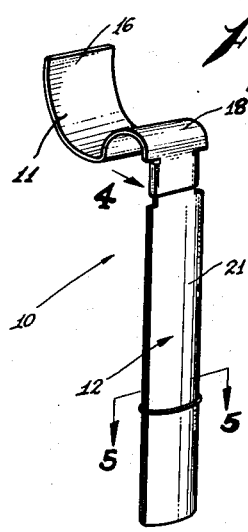
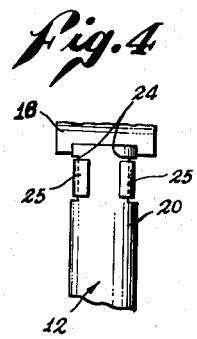
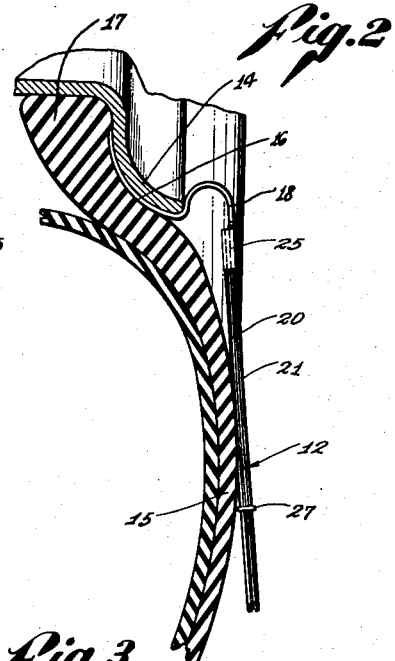
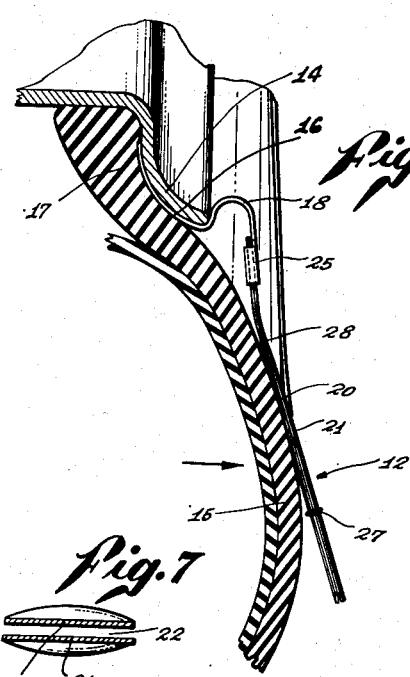
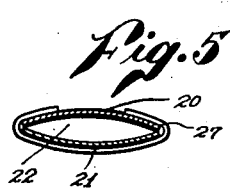
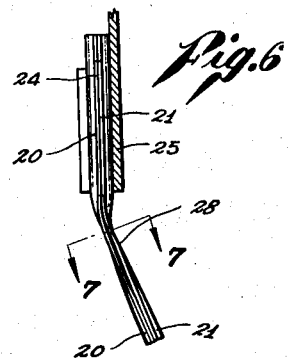
INVENTOR.
ROBERT C. FIDLER
BY Fulwider & Mattingly
Attorneys Patented Oct. 6, 1953

2,654,337

UNITED STATES PATENT OFFICE 2,654,337

TIRE ALARM

Robert C. Fidler, Los Angeles, Calif.

Application October 23, 1951, Serial No. 252,677

4 Claims. (Cl. 116—34)

My invention relates generally to signal devices, and more particularly to an audible alarm for indicating under-inflation or low pressure in a pneumatic tire.

A preferred embodiment of the invention is adapted to be mounted on a wheel rim to extend against the side wall of a pneumatic tire, and is mechanically actuated by contact with the riding bulge which develops under partial deflation of the tire. As the tire bulge forces the device outwardly, it causes transverse flexure of a tensioned sounding means which emits high frequency sound waves having a characteristic snapping or crackling sound. The intensity of the sound is sufficiently strong to be heard over the operating noises of the vehicle and the driver is warned of the tire condition.

While devices of a generally similar character have been proposed, they have not been sufficiently sensitive to be of practical value. An embodiment of my invention is responsive to a pressure drop of only a few pounds per square inch within the tire, and thus warns the driver before any extensive damage is incurred. Furthermore, the required sensitivity of the device must be achieved without loss of signal strength, as the sound must carry over the road noises and be audible even within a closed vehicle. The difficulty of obtaining such signal strength with a lightweight and sensitive sounding means has been a major problem, preventing the proper operation of prior art devices.

With the foregoing in mind, it is an object of my invention to provide an improved tire alarm having a high degree of sensitivity and a clearly audible sound signal.

It is also an object of my invention to provide a tire alarm having sounding means which are adapted for sharp flexure across a minimum longitudinal area to produce a relatively strong sound signal.

Another object of my invention is to provide a tire alarm having pretensioned sounding means which are self-supporting along the entire length thereof, and are formed for flexure in either direction from a normal position.

It is a further object of my invention to provide opposed sounding reeds extending in parallel face-to-face relationship whereby a partially enclosed sound chamber is defined, and each reed acts as a reflecting wall to amplify the sound waves emitted upon flexure of the other reed.

An additional object of my invention is to provide a tire alarm having an easily mounted supporting flange for use with any size of rim and tire, and which is simply and economically manufactured.

Still another object of my invention is to provide by the use of said opposed reeds a smooth surface of contact on the tire wall to prevent frictional wear thereon.

These and other objects and advantages of my invention will become apparent from the following detailed description of a preferred form thereof, and from an inspection of the accompanying drawings, in which:

Figure 1 is a perspective view of a preferred embodiment of my invention;

Figure 2 is a partial cross-section through a wheel and tire, showing the signal device installed in operative position thereon;

Figure 3 is a view similar to Figure 2, showing the sounding means in a displaced flexed position;

Figure 4 is a partial rear elevation taken in the direction of the arrow 4 of Figure 1;

Figure 5 is a cross-section taken along the line 5—5 of Figure 1;

Figure 6 is a longitudinal partial section through the supporting flange and sounding means; and Figure 7 is a cross-section taken along the line 7—7 in Figure 6.

Referring now to the drawings, and particularly to Figure 1 thereof, the numeral 10 indicates generally a preferred embodiment of the invention having an upper supporting flange 11 and a dependent elongated lower sounding means 12. Flange 11 is installed on the vehicle wheel so that sounding means 12 is mechanically flexed by contact with the side wall of the tire if the latter is deflated.

As is seen in Figure 2, a flange 11 has a generally S-shaped curvature, and is adapted to be inserted between the marginal lip of a wheel rim 14 and the inner portion of a pneumatic tire 15. The inner portion of the flange 11 is bent concavely upwardly to provide a supporting surface 16 which overrides the interior of rim 14 and is wedged tightly in place by an inner beading 17 formed on tire 15. The outer portion of flange 11 is bent upwardly and returns downwardly to form a small-radius ridge 18 which abuts the edge of rim 14 and limits the inward movement of the flange. As can be understood, with the tire in a deflated condition, the supporting surface 16 is easily positioned within rim 14 adjacent the beading 17. Thereafter when the tire is inflated, the outward resilience of the tire wall 15 wedges flange 11 tightly in place and prevents displacement.

Sounding means 12 extends radially outwardly from flange 11 to lie against the side wall of tire 15, and is preferably offset slightly from the vertical plane so that centrifugal force will tend to hold it tightly against the tire. In the preferred form of the device, sounding means 12 comprises a pair of elongated inner and outer reeds 20 and 21 extended in parallel, adjacent relationship. Each reed 20 and 21 is formed as a straight strip of highly elastic and flexible material such as spring steel, and has a uniform cross-sectional thickness. In the rolling of the strip material for reeds 20 and 21, it is pretensioned so as to have a slight lateral curvature which provides an outer convex face and an inner convex face. As is best seen in Figure 5, the reeds 20 and 21 are placed with the concave faces in abutting relationship so as to define an ellipsoidal inner chamber 22 extending the length thereof. The longitudinal edges of the strips 20 and 21 are aligned respectively, and thus each strip adds longitudinal stiffness and rigidity to the other. By reason of the outer concave surfaces of the rear strip 20, a smooth surface of contact is provided to ride against the side wall of the tire 15. This smooth surface of contact has little or no tendency to cause frictional wear of the material of tire 15, and prevents any damage thereto.

In order to connect reeds 20 and 21 to the mounting flange 11, the upper ends of each of the reeds are provided with rectangular notches or recesses 24, as is seen in Figure 4. The terminal end of flange 11 is serrated to provide spaced opposed mounting lugs 25 which are crimped rearwardly around reeds 20 and 21 to interlock the recesses 24 and prevent longitudinal movement. The crimping operation of lugs 25 is done in such a manner as to bend the lugs arcuately and thus hold the ends of reeds 20 and 21 in their normal shape with the lateral curvature therein. As can be appreciated, the mounting flange 11 is subject to considerable modification but the preferred form shown herein is extremely simple and economical to manufacture, being completely formed in two stamping operations. Preferably the entire device is weatherproofed and plated to insure that it will be durable and unimpaired by water, snow or other rust-forming conditions.

An important advantage of the preferred form of my invention is the fact that the entire device is extremely light-weight. The complete device weights but ⅜ ounce, and thus it has little tendency to destroy the correct weight balance of the wheels. This light-weight construction also minimizes the centrifugal effect on the device, and prevents its being thrown off the wheel or displaced in high speed operation of the vehicle.

Near the lower free ends of reeds 20 and 21 I provide an encircling clamp 27 which prevents separation of the reeds and holds the longitudinal edges in alignment with each other. Clamp 27 is formed as a thin resilient wire member which holds the edges of reeds 20 and 21 in exact alignment but is relatively slidable thereon. Thus, when the reeds 20 and 21 are flexed outwardly from the tire wall, longitudinal slippage between the reeds may take place to allow a larger radius of bend in the reed furthest from the center of the bend. This feature provides a high degree of flexibility in the inner portions of the reeds while insuring that the outer ends of the reeds will remain together for mutual support. Reeds 20 and 21 normally extend along the side wall of tire 15 and lie flat thereagainst, as is seen in Figure 2. Because of the outwardly convex shape of reeds 20 and 21, they are relatively stiff along the longitudinal axis and tend to resist any outward movement. Since each reed adds longitudinal stiffness to the other, it can be seen that there is little or no tendency for the reeds to buckle or bend at their outer ends.

When the pressure within tire 15 becomes less than standard, the weight of the vehicle causes the tire walls to bulge or sag adjacent the point of road contact as illustrated in Figure 3. As the wheel rotates, the bulge moves around the periphery of the tire and upon each revolution passes by the sounding means 12. Reeds 20 and 21 are forced to deflect outwardly from tire 15 and flex transversely at a small area of flexure 28 which is located between the lower clamp 27 and the mounting lugs 25.

The outer reed 21 is flexed back against its normal surface of curvature until the surface is caused to bend or dimple inwardly in a sharp snapping movement. Within the area of flexure 28, reed 21 no longer has its outwardly convex curvature but is dimpled into a substantially flat shape as seen in Figure 7. At the same time reed 20 has been bent inwardly so as to approach the surface of reed 21. When reed 21 snaps inwardly, the bending of the material causes high frequency sond waves to be emitted and produce a sharp cracking signal. Waves striking the wall surface of the opposite reed 20 are reflected back to amplify the intensity of the signal. These sound waves travel outwardly through the open-ended sound chamber 22, and thence rediate upwardly into the vehicle. The result is a signal of sufficient strength to be clearly audible to the driver and warn him of the deflection of the tire. As can be understood, a signal is emitted both when the reed 21 is flexed and when it returns to the normal position. Thus, two signals occur upon each revolution of the wheel to provide an intermittent sound which is quite attention-arresting.

The signal strength of the sound waves emitted are dependent to a large extent upon the sharpness or rapidity with which the reed flexure occurs. By the use of the opposed reeds 20 and 21, the structure is made very stiff and resists bending along the length thereof. This causes the area of flexure 28 to be of minimum length and results in a sharp dimpling of reed 21. The provision of the sounding chamber 22 and the adjacent reflecting wall surface 20 also tends to increase the signal strength of the sound. The device may be made very responsive to lateral deflection by the use of a thin and highly tensioned reed so that the warning signal will occur upon a drop of only a few pounds per square inch of pressure within the tire, and will yet be sufficiently strong to be clearly audible because of the amplifying characteristics of the device.

While I have described in detail a preferred embodiment of my invention which is fully capable of carrying out the aforementioned objects and advantages, it is to be understood that modifications of design and construction will be apparent to those skilled in the art. Therefore, I do not wish to be limited to the details described herein, except as defined in the appended claims.

I claim:

1. A tire alarm signal device comprising: a mounting flange adapted to be mounted on a wheel rim; a pair of elongated flexible sounding strips extending from said flange in mutual supporting relationship with one of said strips being positioned for contact with the side wall of a tire mounted on said rim, said strips being pretensioned into an outwardly convex transverse curvature and being placed face-to-face to define an elongated inner chamber; and means clamping the outer ends of said strips together while permitting relative sliding movement therebetween.

2. A tire alarm signal device comprising: a mounting flange adapted to be mounted on a wheel rim; a pair of elongated flexible sounding strips extending from said flange in mutual supporting relationship with one of said strips being positioned for contact with the side wall of a tire mounted on said rim, said strips being pretensioned into an outwardly convex transverse curvature and being placed face-to-face to define an elongated inner chamber; means on said mounting flage for securing said strips thereon and holding the ends of said strips tightly in their normal outwardly convex curvature; and means encircling the outer ends of said strips and holding the edges thereof in alignment, while permitting relative sliding movement therebetween.

3. A tire alarm signal device comprising: a mounting flange curved arcuately for insertion adjacent the marginal edge of a wheel rim and having an outer ridge portion to abut said rim and limit the insertion thereof; a pair of elongated flexible sounding strips extending from said flange in mutual supporting relationship with one of said strips being positioned for contact with the side wall of a tire mounted on said rim, said strips being pretensioned into an outwardly convex transverse curvature and being placed face-to-face to define an elongated inner chamber; opposed mounting lugs formed on the end of said flange for securing said strips thereon and holding the ends of said strips tightly in their normal outwardly convex curvature; and means encircling the outer ends of said strips and holding the edges thereof in alignment while permitting relative sliding movement therebetween.

4. A tire alarm signal device comprising: a mounting flange curved arcuately for insertion adjacent the marginal edge of a wheel rim and having an outer ridge portion to abut said rim and limit the insertion thereof; a pair of elongated flexible sounding strips extending from said flange in mutual supporting relationship, with one of said strips positioned for contact with the side wall of a tire mounted on said rim, said strips being pretensioned into an outwardly convex transverse curvature and being placed face-to-face to define an elongated inner chamber, the inner ends of said strips being recessed to provide securing slots; opposed mounting lugs formed at the outer end of said flange for engagement with said recessed strip ends to prevent longitudinal movement of said strips, said lugs being curved arcuately to hold the ends of said strips in their normal outwardly convex curvature; and a clamping member encircling said strips near the outer ends thereof and holding the longitudinal edges in alignment while permitting relative sliding movement therebetween.

ROBERT C. FIDLER.

References Cited in the file of this patent

UNITED STATES PATENTS

| Number | Name | Date |
|---|---|---|
| 1,768,999 | Sim | July 1, 1930 |
| 1,841,248 | Kirtley | Jan. 12, 1932 |
| 2,521,280 | Bowman | Sept. 5, 1950 |